United States Patent
Verma et al.

(10) Patent No.: US 9,430,227 B2
(45) Date of Patent: Aug. 30, 2016

(54) AUTOMATIC CUSTOMIZATION OF A SOFTWARE APPLICATION

(71) Applicants: Anshu Verma, Bangalore (IN); Nemmara S. Chithambaram, Fremont, CA (US); Vishwanath Ranhanath, Bangalore (IN); John Robert Shapiro, San Francisco, CA (US)

(72) Inventors: Anshu Verma, Bangalore (IN); Nemmara S. Chithambaram, Fremont, CA (US); Vishwanath Ranhanath, Bangalore (IN); John Robert Shapiro, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 94 days.

(21) Appl. No.: 13/917,498

(22) Filed: Jun. 13, 2013

(65) Prior Publication Data

US 2014/0372980 A1    Dec. 18, 2014

(51) Int. Cl.
G06F 9/44    (2006.01)
G06F 9/445    (2006.01)

(52) U.S. Cl.
CPC . *G06F 8/71* (2013.01); *G06F 8/61* (2013.01); *G06F 8/64* (2013.01); *G06F 8/70* (2013.01); *G06F 9/4451* (2013.01)

(58) Field of Classification Search
None
See application file for complete search history.

(56) References Cited

U.S. PATENT DOCUMENTS

| | | | |
|---|---|---|---|
| 5,819,249 A | | 10/1998 | Dohanich et al. |
| 5,944,790 A | * | 8/1999 | Levy ............................. 709/218 |
| 6,018,730 A | | 1/2000 | Nichols et al. |
| 6,202,052 B1 | | 3/2001 | Miller |
| 6,253,193 B1 | | 6/2001 | Ginter et al. |
| 6,311,190 B1 | | 10/2001 | Bayer et al. |
| 7,249,072 B1 | | 7/2007 | Nearhood et al. |
| 7,279,216 B2 | | 10/2007 | Chen et al. |
| 7,603,301 B1 | | 10/2009 | Regan |
| 7,636,742 B1 | | 12/2009 | Olavarrieta et al. |
| 7,693,760 B1 | | 4/2010 | Fiteni et al. |
| 7,761,484 B2 | | 7/2010 | Christensen et al. |

(Continued)

FOREIGN PATENT DOCUMENTS

| | | |
|---|---|---|
| EP | 2463786 A1 | 6/2012 |
| WO | 2006026636 A2 | 3/2006 |
| WO | 2013012726 A2 | 1/2013 |

OTHER PUBLICATIONS

International Search Report issued in corresponding International Application No. PCT/US2013/057340 dated Mar. 25, 2014 (5 pages).

(Continued)

*Primary Examiner* — Lewis A Bullock, Jr.
*Assistant Examiner* — Mark Gooray
(74) *Attorney, Agent, or Firm* — Osha Liang LLP (57) ABSTRACT

A method for configuring a software application. The method includes obtaining user profiles each containing attribute values corresponding to a portion of an attribute list, identifying a user subset having same attribute values for a particular portion of the attribute list and forming an attribute signature, analyzing the configuration setting used by each user in the user subset to generate a statistical measure representing the user subset configuring the software application, matching a new user profile to the attribute signature of the user subset, presenting, to the new user and in response to the matching, the statistical measure representing the user subset configuring the software application, and receiving, in response to presenting the statistical measure, an approval from the new user to customize the software application, where the software application is automatically customized based on the statistical measure representing the user subset configuring the software application.

20 Claims, 7 Drawing Sheets

(56) References Cited

U.S. PATENT DOCUMENTS

| | | | |
|---|---|---|---|
| 7,774,195 B2 | 8/2010 | Kohlmeier et al. | |
| 7,814,470 B2 | 10/2010 | Mamou et al. | |
| 7,853,444 B2 | 12/2010 | Wang et al. | |
| 7,860,763 B1 | 12/2010 | Quinn et al. | |
| 7,970,796 B1 | 6/2011 | Narayanan | |
| 7,984,151 B1* | 7/2011 | Raz et al. | 709/226 |
| 8,170,933 B1 | 5/2012 | Cameron et al. | |
| 8,219,907 B2 | 7/2012 | Kohlmeier et al. | |
| 8,296,720 B2 | 10/2012 | Coulthard et al. | |
| 8,386,653 B2 | 2/2013 | Wright et al. | |
| 8,402,047 B1 | 3/2013 | Mangini et al. | |
| 8,452,676 B1 | 5/2013 | Talan et al. | |
| 8,489,980 B2 | 7/2013 | Lakritz | |
| 8,621,416 B1* | 12/2013 | Thomas | 717/100 |
| 8,631,330 B1 | 1/2014 | Hwang et al. | |
| 2001/0042080 A1 | 11/2001 | Ross | |
| 2003/0167197 A1 | 9/2003 | Shoemaker et al. | |
| 2003/0204498 A1 | 10/2003 | Lehnert | |
| 2004/0019540 A1 | 1/2004 | William et al. | |
| 2004/0019541 A1 | 1/2004 | William et al. | |
| 2004/0172447 A1 | 9/2004 | Miller | |
| 2004/0242322 A1* | 12/2004 | Montagna et al. | 463/29 |
| 2005/0102283 A1 | 5/2005 | Anderson et al. | |
| 2005/0160458 A1* | 7/2005 | Baumgartner | 725/46 |
| 2006/0123080 A1* | 6/2006 | Baudino et al. | 709/204 |
| 2006/0143183 A1* | 6/2006 | Goldberg et al. | 707/10 |
| 2006/0155618 A1 | 7/2006 | Wyle | |
| 2007/0021982 A1 | 1/2007 | Sun | |
| 2007/0136156 A1 | 6/2007 | Seeley et al. | |
| 2007/0174108 A1 | 7/2007 | Monster | |
| 2007/0282912 A1* | 12/2007 | Reiner | 707/104.1 |
| 2008/0133216 A1 | 6/2008 | Togami | |
| 2009/0063128 A1 | 3/2009 | Seo et al. | |
| 2009/0112683 A1* | 4/2009 | Hamilton et al. | 705/10 |
| 2009/0234711 A1* | 9/2009 | Ramer et al. | 705/10 |
| 2010/0030616 A1 | 2/2010 | Criner | |
| 2010/0042518 A1 | 2/2010 | Handa et al. | |
| 2010/0058169 A1 | 3/2010 | Demant et al. | |
| 2010/0107114 A1 | 4/2010 | Zachcial | |
| 2010/0205416 A1 | 8/2010 | Lanner et al. | |
| 2011/0022381 A1 | 1/2011 | Gao et al. | |
| 2011/0029420 A1 | 2/2011 | Bianco et al. | |
| 2011/0087481 A1 | 4/2011 | Yang et al. | |
| 2011/0144972 A1 | 6/2011 | Koenig | |
| 2011/0191215 A1 | 8/2011 | Nadler et al. | |
| 2011/0191246 A1 | 8/2011 | Brandstetter et al. | |
| 2011/0197285 A1 | 8/2011 | Ginter et al. | |
| 2011/0246173 A1 | 10/2011 | Li et al. | |
| 2011/0307495 A1 | 12/2011 | Shoshan | |
| 2012/0036078 A1 | 2/2012 | Dean et al. | |
| 2012/0060112 A1 | 3/2012 | Wilson et al. | |
| 2012/0079477 A1 | 3/2012 | Boss et al. | |
| 2012/0123766 A1 | 5/2012 | Anisimovich et al. | |
| 2012/0191580 A1 | 7/2012 | Bhatt | |
| 2012/0239381 A1 | 9/2012 | Heidasch | |
| 2012/0241959 A1 | 9/2012 | Bergstedt | |
| 2012/0278213 A1 | 11/2012 | Bristow et al. | |
| 2012/0330721 A1* | 12/2012 | Volpe et al. | 705/7.32 |
| 2013/0012726 A1 | 1/2013 | Yee et al. | |
| 2013/0060765 A1 | 3/2013 | Lin et al. | |
| 2013/0238540 A1* | 9/2013 | O'Donoghue et al. | 706/46 |
| 2013/0288212 A1* | 10/2013 | Bist | 434/236 |
| 2014/0022951 A1 | 1/2014 | Lemieux | |
| 2014/0201045 A1* | 7/2014 | Pai et al. | 705/31 |

OTHER PUBLICATIONS

Written Opinion issued in corresponding International Application No. PCT/US2013/057340 dated Mar. 25, 2014 (4 pages).

International Search Report issued in International Application No. PCT/US2013/057725 dated May 19, 2014 (5 pages).

Written Opinion issued in International Application No. PCT/US2013/057725 dated May 19, 2014 (8 pages).

Intuit, "TurboTax/MacInTax for Business Streamlines Tax Preparation for Small Business Owners," Intuit Press Release, Jan. 6, 1999 (2 pages).

Patent Examination Report No. 1 for Patent Application No. 2013392097, IP Australia, Dec. 14, 2015, 3 pages.

International Search Report for PCT/US2012/050151, dated Jan. 31, 2013 (5 pages).

Written Opinion for PCT/2012/050151, dated Jan. 31, 2013 (4 pages).

* cited by examiner

AUTOMATIC CUSTOMIZATION OF A SOFTWARE APPLICATION

BACKGROUND

Software applications for small businesses often offer limited pre-configured SKUs (i.e., stock-keeping units, such as SimpleStart, Essential, and Premium) for user selection. However, small business practices vary by industry segments, geographic locations, languages, and culture-related business processes. For example, there may be thousands of industry segments, hundreds of tax codes and currencies based on geographic locations, over six thousand languages, and numerous culture related business processes (e.g., using checks in the United States of America (US), versus using überweisung in Germany). These differing processes create numerous requirements for software application configurations to accommodate different needs of diverse small business practices.

SUMMARY

In general, in one aspect, the invention relates to a method for identifying a configuration setting of a software application. The method includes obtaining a plurality of profiles of a plurality of users of the software application, wherein each of the plurality of profiles comprises a plurality of attribute values corresponding to a portion of an attribute list, wherein the plurality of attribute values describe a user of the plurality of users, and wherein at least two of the plurality of profiles correspond to two different portions of the attribute list, identifying, by a computer processor, a subset of the plurality of users having same attribute values for a particular portion of the attribute list, wherein the same attribute values form an attribute signature of the subset of the plurality of users, analyzing, by the computer processor, the configuration setting used by each user in the subset of the plurality of users to generate a statistical measure representing the subset of the plurality of users configuring the software application, matching a new profile of a new user to the attribute signature of the subset of the plurality of users, presenting, to the new user and in response to matching the new profile to the attribute signature, the statistical measure representing the subset of the plurality of users configuring the software application, and receiving, in response to presenting the statistical measure, an approval from the new user to customize the software application, wherein the software application is automatically customized based on the statistical measure representing the subset of the plurality of users configuring the software application.

In general, in one aspect, the invention relates to a system for identifying a configuration setting of a software application. The system includes a processor and memory storing instructions executable by the processor. The instructions include (i) a user profile analyzer configured to obtain a plurality of profiles of a plurality of users of the software application, wherein each of the plurality of profiles comprises a plurality of attribute values corresponding to a portion of an attribute list, wherein the plurality of attribute values describe a user of the plurality of users, and wherein at least two of the plurality of profiles correspond to two different portions of the attribute list, identify a subset of the plurality of users having same attribute values for a particular portion of the attribute list, wherein the same attribute values form an attribute signature of the subset of the plurality of users, and match a new profile of a new user to the attribute signature of the subset of the plurality of users, (ii) a configuration analyzer configured to analyze the configuration setting used by each user in the subset of the plurality of users to generate a statistical measure representing the subset of the plurality of users configuring the software application, present, to the new user and in response to matching the new profile to the attribute signature, the statistical measure representing the subset of the plurality of users configuring the software application, and receive, in response to presenting the statistical measure, an approval from the new user to customize the software application, wherein the software application is automatically customized based on the statistical measure representing the subset of the plurality of users configuring the software application, and (iii) a repository configured to store the plurality of profiles, the attribute signature, the statistical measure, and the configuration setting.

In general, in one aspect, the invention relates to a non-transitory computer readable medium storing instructions for identifying a configuration setting of a software application. The instructions, when executed by a computer processor, include functionality for obtaining a plurality of profiles of a plurality of users of the software application, wherein each of the plurality of profiles comprises a plurality of attribute values corresponding to a portion of an attribute list, wherein the plurality of attribute values describe a user of the plurality of users, and wherein at least two of the plurality of profiles correspond to two different portions of the attribute list, identifying a subset of the plurality of users having same attribute values for a particular portion of the attribute list, wherein the same attribute values form an attribute signature of the subset of the plurality of users, analyzing the configuration setting used by each user in the subset of the plurality of users to generate a statistical measure representing the subset of the plurality of users configuring the software application, matching a new profile of a new user to the attribute signature of the subset of the plurality of users, presenting, to the new user and in response to matching the new profile to the attribute signature, the statistical measure representing the subset of the plurality of users configuring the software application, and receiving, in response to presenting the statistical measure, an approval from the new user to customize the software application, wherein the software application is automatically customized based on the statistical measure representing the subset of the plurality of users configuring the software application.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to automatically configure a software application based on social contribution, machine learning and platform configurability. For example, a single software application may be automatically configured into hundreds of thousands of configurations.

Figure 1:
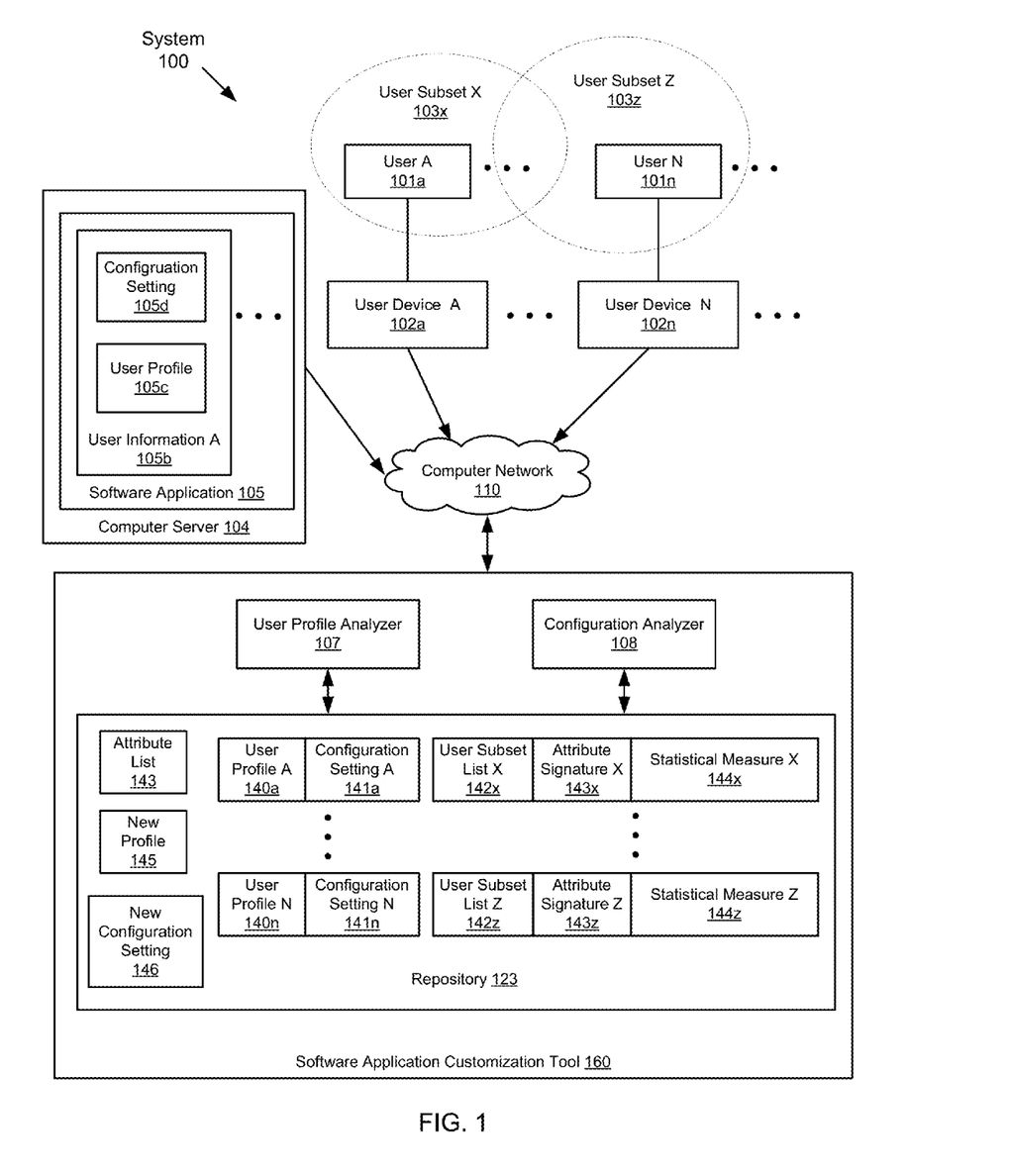
FIG. 1 shows a block diagram of a system in accordance with one or more embodiments of the invention.

FIG. 1 shows a block diagram of a system (100) for automatic customization of software application in accordance with one or more embodiments of the invention. Specifically, the system (100) includes a user device A (102a) used by a user A (101a), a user device N (102n) used by a user N (101n), a computer server (104) installed with a software application (105), and a software application customization tool (160) coupled via a computer network (110). In one or more embodiments of the invention, the software application customization tool (160), or a portion thereof, may be integrated with the software application (105). In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

In one or more embodiments of the invention, the computer network (110) may include a cellular phone network, a wide area network, a local area network, a public switched telephone network (PSTN), or any other suitable network that facilitates the exchange of information from one part of the network to another. In one or more embodiments, the computer network (110) is coupled to or overlaps with the Internet.

In one or more embodiments, each of the user device A (102a), the user device N (102n), and the software application customization tool (160) may include any computing device configured with computing, data storage, and network communication functionalities. Generally, the user device A (102a) and the user device N (102n) are among multiple user devices used by multiple users. In one or more embodiments, these multiple users may be divided into subsets, such as the user subset X (103x) including the user A (101a). Further, some of these user subsets may overlap each other. For example, the user subset Z (103z) may be a superset or an overlapped set of the user subset X (103x). In one or more embodiments, one or more of the user device A (102a) and the user device N (102n) may be a mobile device, such as a cellular phone or a smartphone that is used to access the software application (105) via the computer network (110).

In one or more embodiments, the software application (105) may be an accounting application, a payroll application, a personnel application, or any business management application. In one or more embodiments, the software application (105) is provided by an application service provider, such as a software as a service (SaaS). For example, the computer server (104) may be operated by the application service provider (ASP) and accessed by the user A (101a) and user N (101n) on a subscription basis. In one or more embodiments, user information for users (e.g., user information A (105b) for user A (101a), and other user information for other users) of the application software (105) are stored for providing customized functionalities to these users. For example, the user information A (105b) may include a user profile (105c) of the user A (101a) and the configuration setting (105d) for the user A (101a). In one or more embodiments, the user profile (105c) includes attribute values, such as a geographic region, a business category, a language, a currency, a tax code, etc. of the user A (101a). In addition, the configuration setting (105d) may include a chart of accounts, an invoice setting, a sales receipt setting, etc. used by the user A (101a) to customize the software application (105). Although not explicitly shown in FIG. 1, the user information A (105b) may also include automatically captured user behavioral data (e.g., click stream, activity logs, etc.) that represents how the user A (101a) interacts with the software application (105). Although the user information A (105b) is shown in FIG. 1 as stored within the software application (105), in one or more embodiments, the user information A (105b) may not persist within the software application (105). In such embodiments, the user information A (105b) is stored in the repository (123) as the user profile A (140a) and the configuration setting A (141a). For example, information stored in the user profile A (140a) and the configuration setting A (141a) may be retrieved by, or used to configure the software application (105), as needed, instead of persisting within the software application.

As shown in FIG. 1, the software application customization tool (160) includes a user profile analyzer (107), a configuration analyzer (108), and a repository (123) storing information used and/or generated by the user profile analyzer (107) and the configuration analyzer (108).

In one or more embodiments, the user profile analyzer (107) is configured to obtain user profiles (e.g., user profile (105c) for the user A (101a) and other user profiles of other users) of the software application (105). For example, the obtained user profiles may be stored in the repository (123) as the user profile A (140a) and the user profile N (140n) for the user A (101a) and the user N (101n), respectively. As noted above, each user profile includes a number of attribute values describing one of the users (e.g., user A (101a), user N (101a)) of the software application (105). In particular, the attribute values in each user profile corresponds to a portion of an attribute list (143). In one or more embodiments, the attribute values in each user profile may be explicitly provided by the user or automatically derived based on the data entered by the user. For example, some attribute values (e.g., geographic region, business category, etc.) in the user profile A (140a) may be provided by the user A (101a). In addition, other attribute values (e.g., language, currency, typical chart of account for the business category, etc.) in the user profile A (140a) may be inferred by the software application (105) based on input of the user A (101a). While the software application (105) may support a complete list of attributes (i.e., the attribute list (143)), each user's user profile may have attribute values corresponding to only a subset of the complete attribute list (143). In other words, user profiles may not include attribute values for all attributes in the complete attribute list (143). For example, the user profile A (140a) may include the geographic region of the user A (101a) as United States and the business category of the user A (101a) as a gardener vendor, but may not include the language, currency, or tax code used by the user A (101a). In contrast, the user profile N (140n) of the user N (101n) may include the business category, language, and currency of the user N (101n) as poultry vendor, English, and U.S. dollars, respectively, but may not include the geographic region or tax code of the user N (101n).

In one or more embodiments, the user profile analyzer (107) is further configured to analyze the obtained user profiles (e.g., user profile A (140a), user profile N (140n)) to identify a subset of users (e.g., user subset X (103x), user subset Z (103z)) having the same attribute values for a particular portion of the attribute list (143). In particular, user subset X (103x) and user subset Z (103z) are identified and tracked using the user subset list X (142x) and the user subset list Z (142z), respectively, that may be stored in the repository (123). Specifically, the same attribute values form an attribute signature of the subset of users. For example, all users listed in the user subset list X (142x) belong to the user subset X (103x) and share a set of same attribute values for a particular portion of the attribute list (143). The set of same attribute values form the attribute signature X (143x). Although all users listed in the user subset list X (142x) share the same attribute values for the particular portion of the attribute list (143), any user in the user subset list X (142x) may have additional attribute values outside the particular portion of the attribute list (143). Similarly, all users listed in the user subset list Z (142z) belong to the user subset Z (103z) and share another set of same attribute values for another portion of the attribute list (143). The other set of same attribute values form the attribute signature Z (143z).

In one or more embodiments, the software application customization tool (160) includes the configuration analyzer (108) that is configured to analyze the configuration setting (e.g., configuration setting A (141a)) used by each user (e.g., user A (101a)) in a user subset (e.g., user subset X (103x)) to generate a statistical measure (e.g., statistical measure X (144x)) representing these users (e.g., user A (101a)) in the user subset (e.g., user subset X (103x)) configuring the software application (105). For example, the statistical measure X (144x) may include a statistical distribution (e.g., average, median, mode, range of values, probability distribution, histogram, etc.) of one or more configuration parameter values (e.g., pre-configured discount, tax rate, etc. used by an invoice generation module of the software application (105)) used by users in the user subset X (103x). Similarly, the configuration settings (e.g., configuration setting N (141n)) used by users (e.g., user N (101n)) in the user subset Z (103z)) are analyzed to generate the statistical measure Z (144z)) representing these users (e.g., user N (101n)) in the user subset Z (103z)) configuring the software application (105).

In one or more embodiments, the configuration analyzer (108) is further configured to compare a new profile (145) of a new user (not shown) to the attribute signatures (e.g., attribute signature X (143x), attribute signature Z (143z)) of various user subsets (e.g., user subset X (103x), user subset Z (103z)) to find a match. For example, the new profile (145) may be matched to the attribute signature X (143x) of the user subset X (103x). In one or more embodiments, in response to the matching, the software application (105) is customized for the new user (not shown) based on the statistical measure X (144x), which is the statistical measure (e.g., average value, range of values, probability distribution, histogram, etc.) representing the user subset X (103x) configuring the software application (105). In other words, the configuration analyzer (108) generates the new configuration setting (146) based on the statistical measure X (144x), where the new configuration setting (146) is used to customize the software application (105) for the new user (not shown). For example, the invoice generation module of the software application (105) may be customized for the new user (not shown) using the average discount and average tax rate in the statistical measure X (144x). In one or more embodiments, the statistical measure X (144x) is presented to the new user (not shown) for approving the customized application software (105). For example, the new user (not shown) may use a statistical standard deviation in the statistical measure X (144x) as a reference to determine whether the average discount and average tax rate used to customize the software application (105) are appropriate for the requirements of the new user (not shown). For example, the new user (not shown) may be convinced that the user profile matching is statistically meaningful based on the statistical standard deviation being less than a pre-determined threshold. In response, the new user approves the automatically customized software application (105).

In one or more embodiments, the software application customization tool (160) includes the repository (123) that is configured to store the user profiles (e.g., user profile A (140a), user profile N (140n), new profile (145)), the configuration settings (e.g., configuration setting A (141a), configuration setting N (141n)), the user subset lists (e.g., user subset list X (142x), user subset list Z (142z)), the attribute signatures (e.g., attribute signature X (143x), attribute signature Z (143z)), and the statistical measures associated with the user subsets (e.g., statistical measure X (144x), statistical measure Z (144z)).

Additional details of analyzing the configuration setting, matching the user profile, and examples of the statistical measure of configuration setting are described in reference to FIG. 2 and FIGS. 3A, 3B, 3C, and 3D below.

Figure 2:
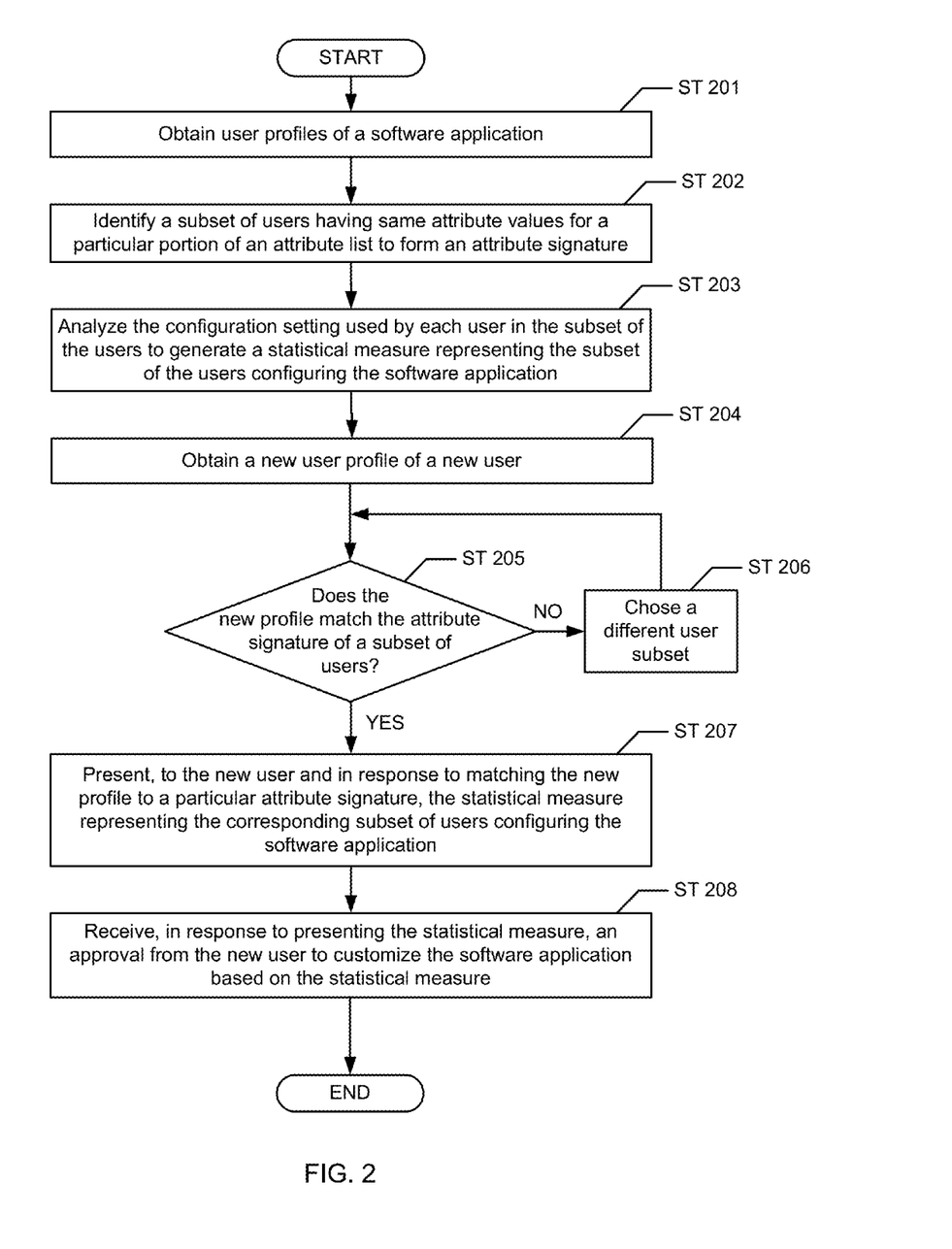
FIG. 2 shows a flow chart of a method in accordance with one or more embodiments of the invention.

FIG. 2 shows a flow chart for automatic customization of software application in accordance with one or more embodiments of the invention. In one or more embodiments of the invention, the method of FIG. 2 may be practiced using the system (100) described in reference to FIG. 1 above. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

Initially in Step 201, one or more profiles (i.e., user profile) of users of the software application are obtained. In one or more embodiments, the software application may be an accounting application, a payroll application, a personnel application, or any other business management application. In one or more embodiments, the user profile includes attribute values, such as a geographic region, a business category, a language, a currency, a tax code, etc. of a user. In one or more embodiments, the user profile further includes additional attribute values, such as user behavioral data inferred from various user interactions (e.g., click stream, data logs, etc.) with the software application. In particular, the attribute values in each user profile corresponds to a portion of a pre-determined attribute list. While the software application may support a complete list of attributes, each user's profile may have attribute values corresponding to only a subset of the complete attribute list. For example, a user may opt-in to provide an attribute values of a particular portion of the pre-determined attribute list, while opt-out to not providing attribute values corresponding to a remainder portion of the pre-determined attribute list. Generally, each user provides his/her own set of attribute values. As a result, at least two of the profiles correspond to two different portions of the pre-determined attribute list.

In Step 202, a subset of users are identified as having the same attribute values for a particular portion of the pre-determined attribute list. Specifically, the same attribute values form an attribute signature of the subset of users. Although all users in a particular user subset share these same attribute values for the particular portion of the pre-determined attribute list, any user in the user subset may have additional attribute values outside the particular portion of the pre-determined attribute list. In one or more embodiments, the attribute signature is based on a longest common substring of the concatenated attribute values in the profiles of all users in the subset of users. In other words, the attribute values in the profile of each user is concatenated into a string, and the longest common substring of all strings of all users in the subset of users is used as the attribute signature.

In Step 203, the configuration settings used by users in a particular subset of users are analyzed to generate a statistical measure representing the particular subset of users configuring the software application. For example, the statistical measure may include a statistical distribution (e.g., average, median, mode, range of values, probability distribution, histogram, etc.) of one or more configuration parameter values (e.g., pre-configured discount, tax rate, etc. used by an invoice generation module of the software application) used by users in the particular user subset.

In one or more embodiments, analyzing the configuration settings for a particular subset of users includes the following steps. Initially, for each user in the subset of users, a value of the configuration setting is retrieved. In particular, the value is used by the corresponding user for configuring a configuration parameter of the software application. For example, a pre-configured discount value in a configuration setting is used by a corresponding user for configuring a customer invoice discount of the software application.

Once the value is retrieved for each user in the subset of users, the corresponding values for all users in the subset of users are aggregated to generate a set of values corresponding to the subset of users. The set of values is then analyzed using a pre-determined clustering algorithm, and based on a pre-determined similarity measure, to extract a cluster of similar values. In particular, the cluster is associated with a user count and a representative value, such as an average value, a median value, a range of values, a statistical distribution of the values, a histogram of the values, etc. In one or more embodiments, multiple clusters may be extracted from the set of values for a particular configuration parameter. The statistical measure representing the particular subset of users configuring the software application may then include the user count and the representative value for each of the multiple clusters. Detailed examples of such clusters and statistical measures are described in reference to FIG. 3C below.

In Step 204, a new profile of a new user of the software application is obtained. For example, the new user may need to customize the software application based on the new profile.

In Step 205, a comparison is performed to determine whether the new profile matches the attribute signature of a subset of users. If the determination is negative, i.e., the match is not found, the method proceeds to Step 206 where a different subset of user is selected and returned to the Step 205 for another comparison iteration. If the determination is positive, i.e., the match is found between the new profile and the attribute signature of a particular subset of users, the method then proceeds to Step 207.

In one or more embodiments, matching the new profile includes at least the following steps. Initially, a particular portion of the attribute list corresponding to the new profile is determined. For example, the new user may opt-in to provide attribute values with respect to the particular portion of the attribute list, and opt-out from providing any additional attribute value with respect to a remainder of the attribute list aside from the particular portion.

In response to determining the particular portion of the attribute list corresponding to the new profile, one or more attribute signatures corresponding to the particular portion of the attribute list are identified/selected for comparison. Specifically, the identified/selected attribute signatures are compared to the attribute values in the new profile to determine if any attribute signature matches the new profile.

In Step 207, in response to matching the new profile to the attribute signature of a particular subset of users, the statistical measure, representing the particular subset of users configuring the software application, is presented to the new user. In one or more embodiments, presenting the statistical measure is by selecting, based on a pre-determined criterion, a cluster extracted from the values of a configuration parameter used by the particular subset of users. Specifically, the cluster corresponds to similar behaviors among all users in the subset of users configuring the configuration parameter of the software application. Accordingly, the representative value (e.g., average value, median value, probability distribution of values, histogram of values, etc.) of the selected cluster is presented to the new user.

In Step 208, in response to presenting the statistical measure, an approval is received from the new user to customize the software application. In particular, the software application is automatically customized based on the statistical measure representing the particular subset of users configuring the software application. In other words, a new configuration setting is generated based on the statistical measure, and used to customize the software application for the new user.

FIGS. 3A-3D show an example in accordance with one or more embodiments of the invention. In particular, the example relates to automatically customizing a software application for a new user John. Although FIGS. 3A-3D show implementation examples of embodiments of the invention, those skilled in the art will appreciate that there may be other ways in which to implement embodiments of the invention, and that the example shown are not meant to limit the scope of the invention.

Figure 3A:
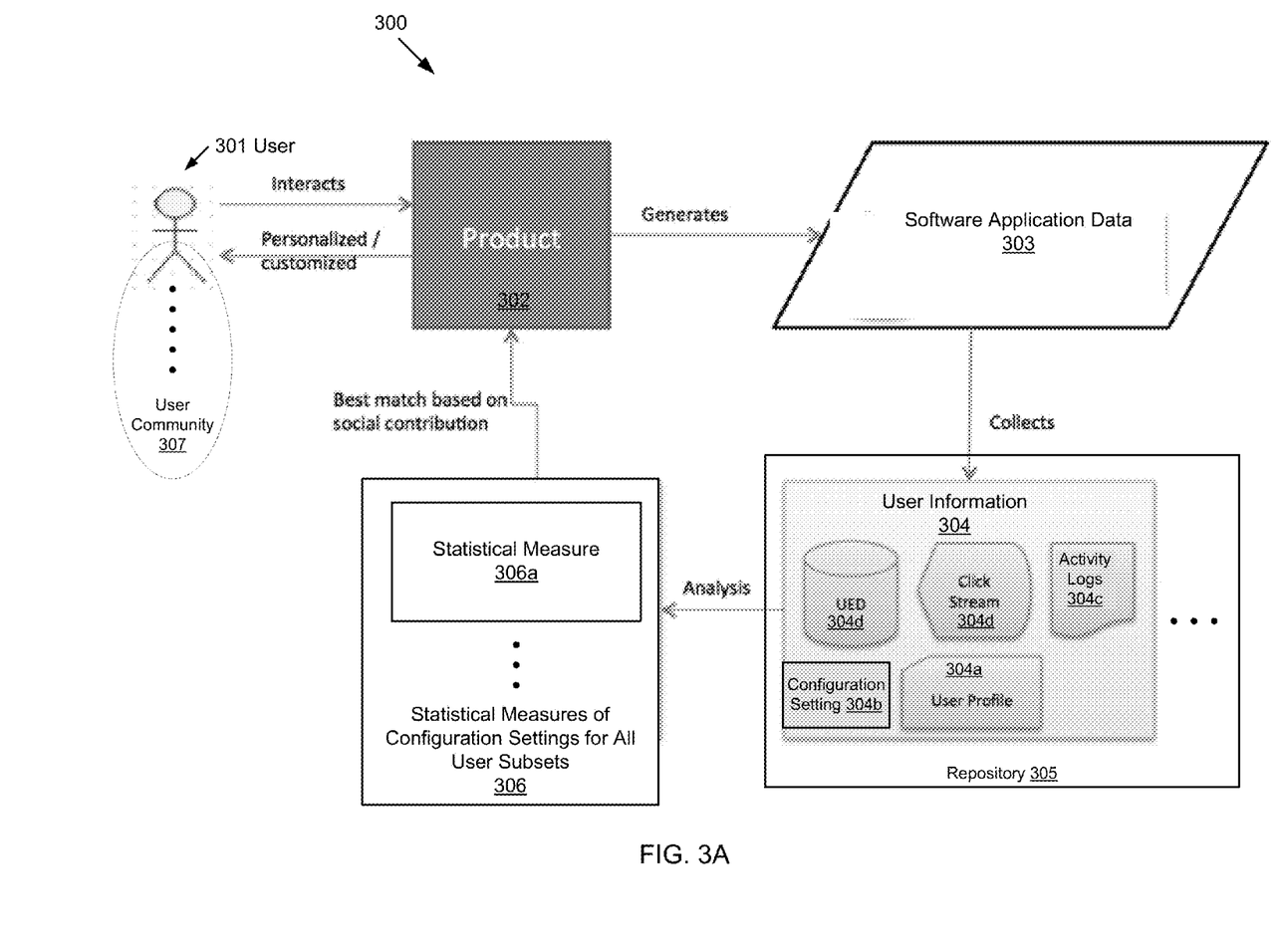
FIGS. 3A, 3B, 3C, and 3D show an example in accordance with one or more embodiments of the invention.

FIG. 3A shows an example flow of automatically customizing the software application (i.e., product (302)) for a user (301) "John." John is an English speaking gardener vendor in the United Kingdom (UK), and is a new user of the software application (i.e., product (302)). In particular, John plans to use the software application (i.e., product (302)) to manage his gardener business activities, such as accounting, banking, payroll, etc. Accordingly, John is shown entering the user community (307) of the software application (i.e., product (302)) partially (i.e., not entirely entered).

The software application (i.e., product (302)) is a software application as a service (SaaS) used by many small business owners (SBOs) in various geographic regions and various business categories. These existing SBO users from the user community (307) of the software application (i.e., product (302)). During each of these SBO users' interaction with the software application (i.e., product (302)), software application data (303) is generated that includes profile information, configuration information, and other user behavioral information. Accordingly, the user information (304) is extracted from the software application data (303) and saved in a repository along with all other SBO users' information. For example, the user information (304) for John includes the user profile data (304a), such as geographic region "UK" that is explicitly entered by John, as well as the language "English," currency "British Pound," and local tax code "VAT" that are derived from the geographic region "UK" based on John's input. Because John is a new user, his user information (304) does not include configuration information or other user behavioral information.

In contrast, in addition to the user profile (304a), the user information (304) for many existing users in the user community (307) also includes the configuration setting (340b), and optionally the automatically captured behavioral data (e.g., activity logs (304c), and click stream (304b), that represents how these existing users have been using the software application (i.e., product (302)). Based on the user profile (304a) of each existing user in the user community (307), an exhaustive list of user subsets are generated. Based on a statistical analysis (e.g., clustering analysis) of user information (304) on a per user subset basis, the statistical measures of configuration settings for all user subsets (306) are generated. For example, the statistical measure (306a) represents the configuration settings for all users in a user subset consisting of English speaking gardener vendors in UK. An example of these user subsets and corresponding statistical measures of configuration settings are described in reference to FIG. 3C below.

By matching John to this user subset consisting of English speaking gardener vendors in the UK, a new configuration setting is generated based on the corresponding statistical measure (306a) to customize the software application (i.e., product (302)) for John. In addition, activity logs (304c) generated from users in the user subset including English speaking gardener vendors in the UK are used to create a list of customized on-boarding macro-commands (e.g., setting up chart of accountants and payroll, announcing business to contacts using SMS, etc.) for John.

Figure 3B:
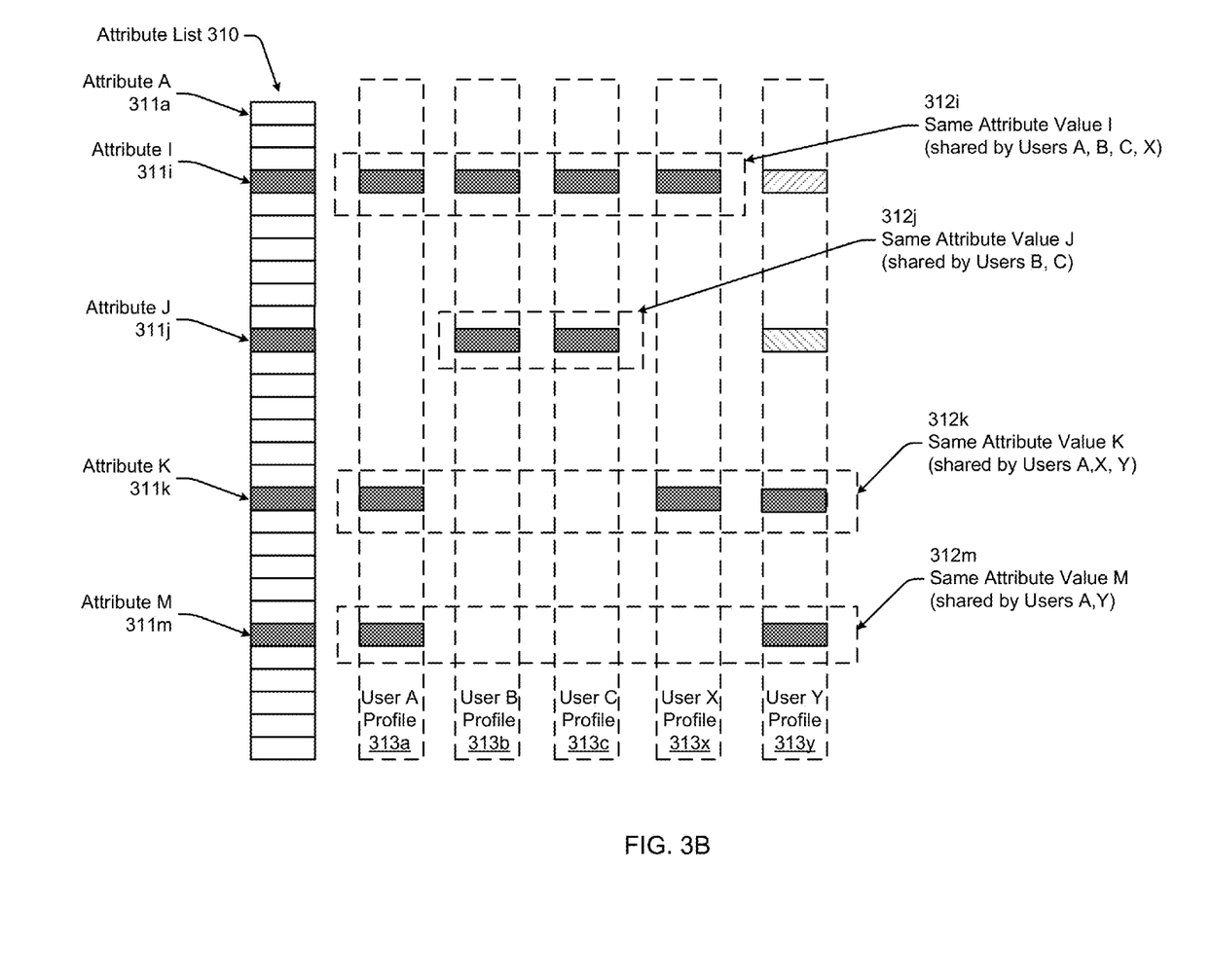

FIG. 3B shows an example of user profiles based on the attribute list (310), which is an example of the attribute list (143) described in reference to FIG. 1 above. As shown in FIG. 3B, the attribute list (310) includes multiple attributes, such as attribute A (311a), attribute I (311i), attribute J (311j), attribute K (311k), attribute M (311m), etc. For example, the attribute A (311a) may be geographic region, attribute I (311i) may be business or industry category, attribute J (311j) may be language, attribute K (311k) may be currency, etc. As noted above, each user may have attribute values in his/her profile that correspond to a portion of the attribute list (310). For example as shown in FIG. 3B, user A profile (313a) has attribute values corresponding to the attribute I (311i), attribute K (311k), and attribute M (311m). Similarly, user B profile (313b) has attribute values corresponding to the attribute I (311i) and attribute J (311j), user C profile (313c) has attribute values corresponding to the attribute I (311i) and attribute J (311j), user X profile (313x) has attribute values corresponding to the attribute I (311i) and attribute K (311k), and user Y profile (313y) has attribute values corresponding to the attribute K (311k), and attribute M (311m).

In the example shown in FIG. 3B, the four users A, B, C, and X have the same attribute value I (312i) for the attribute I (311i) forming a first user subset defined by the attribute signature based on the same attribute value I (312i) (e.g., geographic region=UK), the two users B and C have the same attribute value J (312j) for the attribute J (311j) forming a second user subset defined by the attribute signature based on the same attribute value J (312j) (e.g., business category=gardener), three users A, X, and Y have the same attribute value K (312k) for the attribute K (311k) forming a third user subset defined by the attribute signature based on the same attribute value K (312k) (e.g., language=English), and two users A and Y have the same attribute value M (312m) for the attribute M (311m) forming a fourth user subset defined by the attribute signature based on the same attribute value M (312m) (e.g., Currency=British Pound). In addition, the users A and X form a fifth user subset defined by the attribute signature based on the same attribute value I (312i) and the same attribute value K (312k). The users A and Y form a sixth user subset defined by the attribute signature based on the same attribute value K (312k) and the same attribute value M (312m). Similarly, the users B and C form a seventh user subset defined by the attribute signature based on the same attribute value I (312i) and the same attribute value J (312j). Additional examples of user subsets and corresponding attribute signatures are described in reference to FIG. 3C below.

Figure 3C:
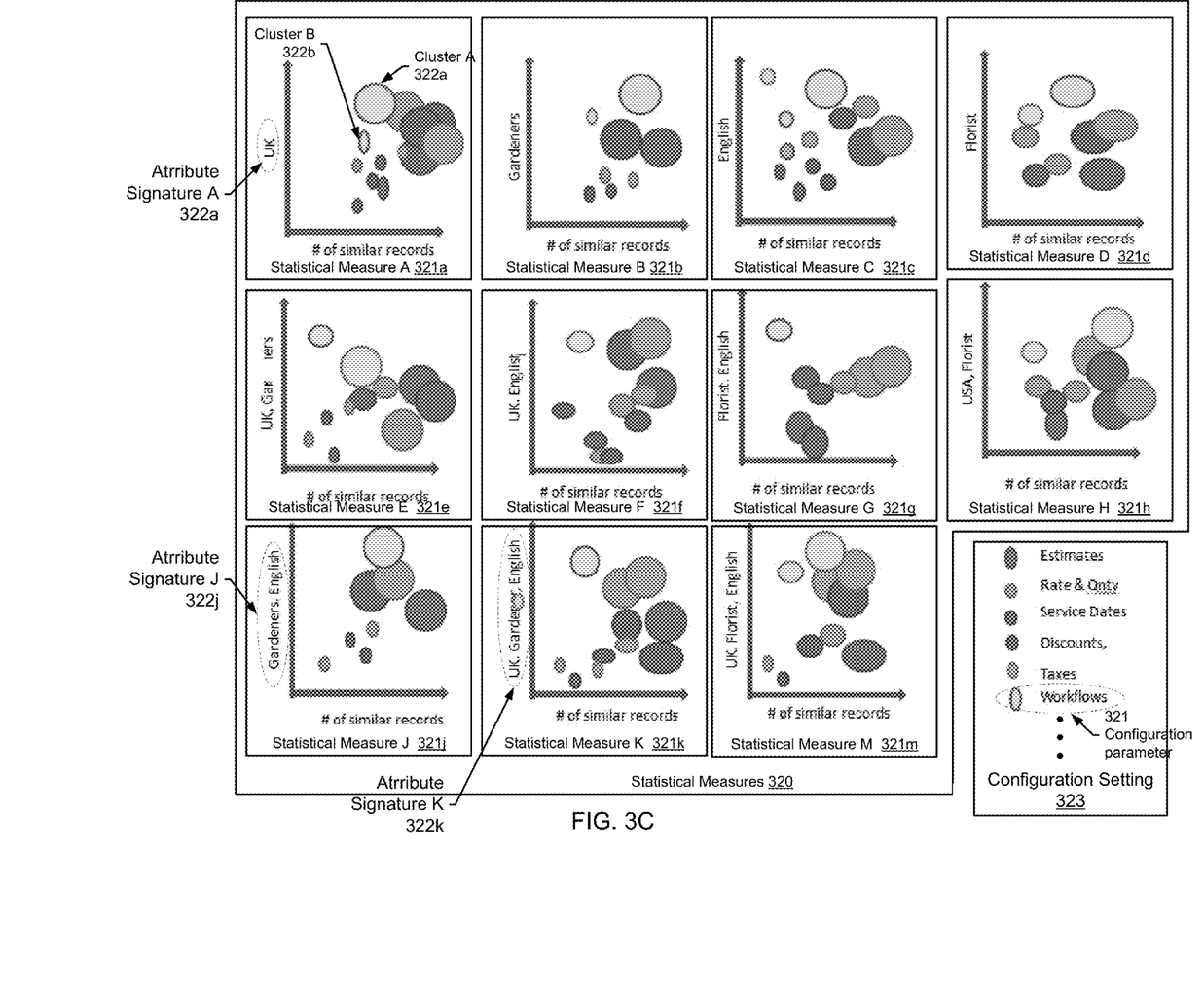

FIG. 3C shows an example of statistical measures (320), which is an example of the statistical measures of configuration settings for all user subsets (306) described in reference to FIG. 3A above. As shown in FIG. 3C, the statistical measures of configuration settings for all user subsets (306) includes the statistical measure A (321a) through statistical measure M (321m), which are examples of the statistical measure X (144x) and statistical measure Z (144z) shown in FIG. 1, as well as the statistical measure (306a) shown in FIG. 3A. Each of the statistical measure A (321a) through statistical measure M (321m) corresponds to a user subset that is defined by a particular attribute signature, such as the attribute signature A (322a) (i.e., UK), the user attribute signature J (322j) (i.e., gardener and English speaking), and the user attribute signature K (322k) (i.e., UK, gardener, and English speaking). Specifically, all users included in the user subset defined by the attribute signature A (322a) are in the geographic region "UK," all users included in the user subset defined by the user attribute signature J (322j) are English speaking gardeners, and all users included in the user subset defined by the user attribute signature K (322k) are English speaking gardeners in UK. In particular, the user subset defined by the user attribute signature K (322k) is a joint set of the two user subsets defined by the attribute signature A (322a) and the user attribute signature J (322j), respectively.

Further as shown in FIG. 3C, the configuration setting (323) includes multiple configuration parameters corresponding to various aspects of the aforementioned software application. For example, the configuration parameter (321) corresponds to the workflow aspect of the software application. Each configuration parameter of the configuration setting (323) is represented by a color or a rendering pattern that is also used to represent a cluster of similar configuration parameter values in each of the statistical measure A (321a) through statistical measure M (321m). For example, the statistical measure A (321a) includes two clusters (i.e., cluster A (322a) and cluster B (322b)) based on similar workflow configuration parameter values. In particular, the vertical dimension and/or position of each cluster along the vertical axis represents the range of configuration parameter values, and the horizontal dimension and/or position of each cluster along the horizontal axis represents the number of users associated with the cluster (i.e., # of similar records).

Figure 3D:
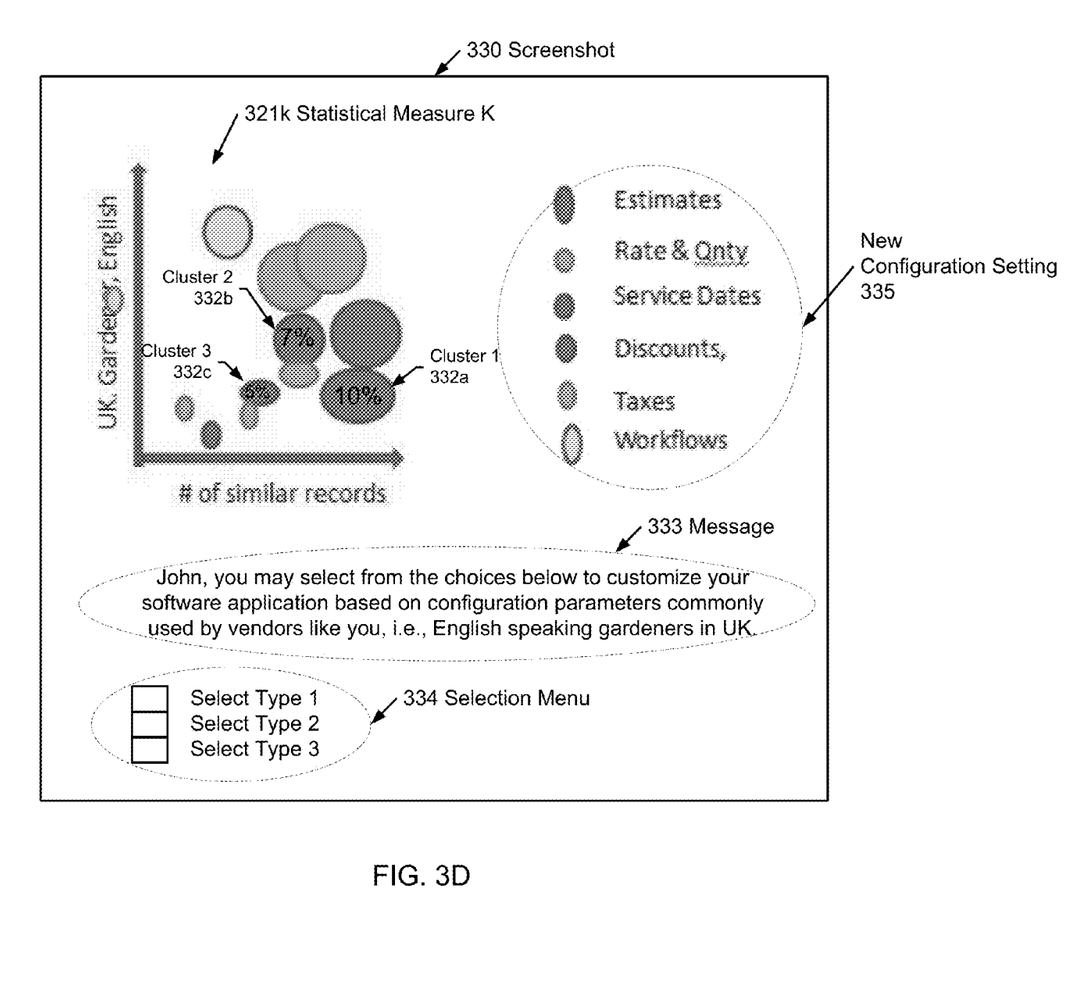

FIG. 3D shows an example screenshot (330) that is presented to John after he is matched to the user subset defined by the attribute signature K (322k) shown in FIG. 3C above. As shown in the screenshot (330), the statistical measure K (321k) corresponding to the matched user subset in FIG. 3C is presented. In particular, the statistical measure K (321k) includes three clusters with respect to the configuration parameter "discount". Specifically, the cluster 1 (332a) has the highest number of users sharing a similar discount around 10% in the matched user subset, the cluster 2 (332b) has the second highest number of users sharing a similar discount around 7% in the matched user subset, and the cluster 3 (332c) has the highest number of users sharing a similar discount around 5% in the matched user subset. In response to viewing the statistical measure K (321k) and the message (333) inviting John to customize his software application, John selects type 1 in the selection menu (334). As a result, a new configuration setting (335) is automatically generated based on the configuration parameters used by those users associated with the cluster 1 (332a). The new configuration setting (335) includes the configuration parameters Estimates, Rate & Qnty, Service Dates, Discounts, Taxes, and Workflows. Accordingly, the software application is automatically customized for John using the new configuration setting (335).

Although John is matched to the user subset defined by the attribute signature K (322k) (i.e., "UK, gardener, English") in the description above, John may also be matched to other user subsets such as those defined by the attribute signatures "UK," "gardener," "English," "UK, gardener," "UK, English," and "gardener, English." In the particular example described above, the matched user subset with the longest (i.e., highest cardinality) attribute signature (i.e., "UK, gardener, English") is selected and the corresponding statistical measure K (321k) is presented to John. In other example, other pre-determined criterion may be used to select one or more of all matched user subsets for presenting corresponding statistical measure(s) to John or any other new user of the software application.

Although the statistical measure K (321k) shown in the screenshot (330) is in a particular bubble diagram format, other formats may also be used, such as a tabular format, a histogram format, a list format, etc. Further, in the scenario where no configuration parameter corresponds to multiple clusters in the statistical measure K (321k), the selection menu (334) may be omitted or substituted by a single user approval button for initiating the automatic customization.

Figure 4:
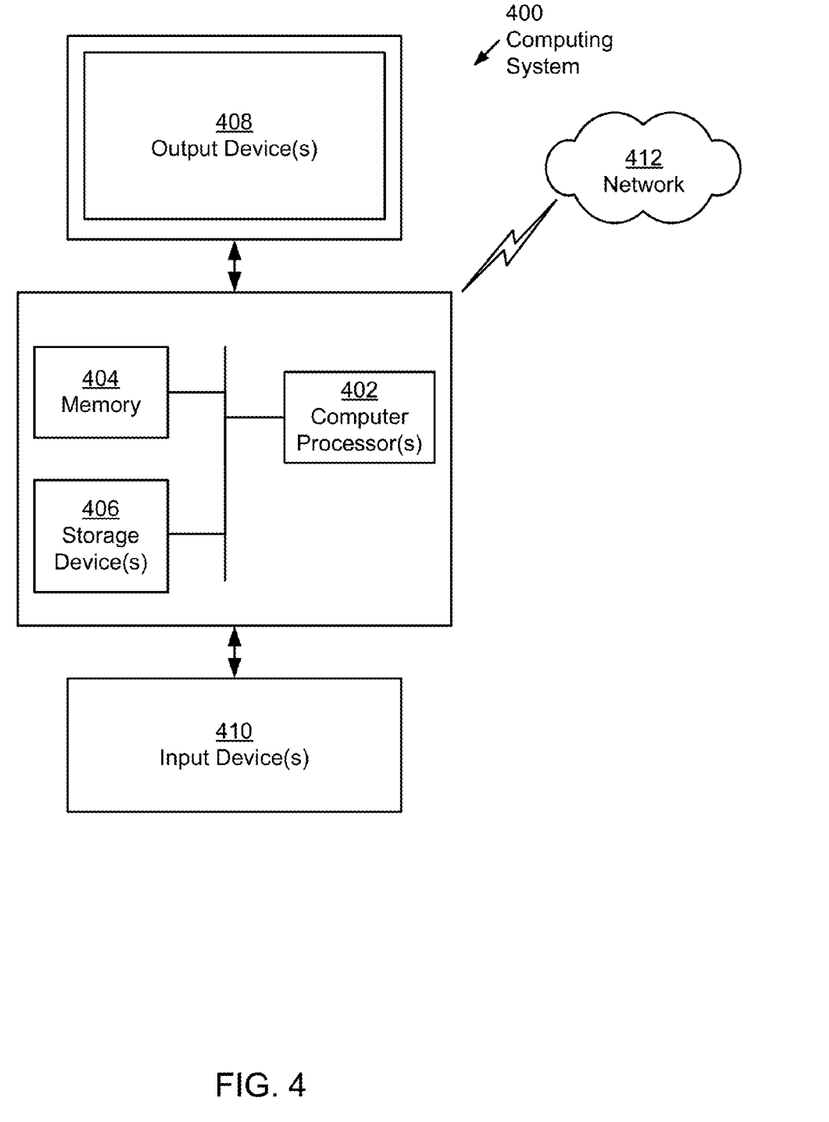
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying a configuration setting of a software application, comprising:
    obtaining a plurality of profiles of a plurality of users of the software application,
        wherein each of the plurality of profiles comprises a plurality of attribute values corresponding to a portion of an attribute list of the software application,
        wherein the plurality of attribute values describe a first business entity associated with a user of the plurality of users, and
        wherein at least two of the plurality of profiles correspond to two different portions of the attribute list;
    identifying, by a computer processor, a first subset of the plurality of users having the plurality of attribute values for a particular portion of the attribute list;
    forming, using the plurality of attribute values, a first attribute signature of the first subset of the plurality of users corresponding to different portions of the attribute list, and a second attribute signature of a second subset of the plurality of users corresponding to different portions of the attribute list;

analyzing, by the computer processor, the software application configuration setting used by each user in the first subset of the plurality of users to generate a first statistical measure representing the first subset of the plurality of users configuring the software application, and the first attribute signature of the first subset of the plurality of users;

analyzing, by the computer processor, the software application configuration setting used by each user in the second subset of the plurality of users to generate a second statistical measure representing the second subset of the plurality of users configuring the software application, and the second attribute signature of the second subset of the plurality of users;

obtaining a new user profile of a new user;

matching the new user profile to the second attribute signature of a second subset of the plurality of users, wherein the new user profile describes a second business entity associated with the new user;

presenting, to the new user and in response to matching the new user profile to the second attribute signature, the second statistical measure representing the second subset of the plurality of users configuring the software application; and receiving, in response to presenting the second statistical measure, an approval from the new user to customize the software application, wherein the software application is automatically customized based on the second statistical measure representing the second subset of the plurality of users configuring the software application.

2. The method of claim 1,
wherein the first attribute signature comprises at least one selected from a group consisting of a geographic region of the first business entity, a business category of the first business entity, a language used by the first business entity, a currency used by the first business entity, and a tax code of the first business entity, and
wherein the configuration setting comprises at least one selected from a group consisting of an invoice setting and a sales receipt setting.

3. The method of claim 1, wherein analyzing the configuration setting comprises:
retrieving, for each user in the first subset of the plurality of users, a value of the configuration setting, wherein the value is used by a corresponding user configuring a configuration parameter of the software application; and
aggregating the value for all users in the first subset of the plurality of users to generate a plurality of values corresponding to the first subset of the plurality of users,
wherein the first statistical measure is based on the plurality of values.

4. The method of claim 3, wherein analyzing the configuration setting further comprises:
extracting, using a pre-determined clustering algorithm and based on a pre-determined similarity measure, a cluster of similar values from the plurality of values, wherein the cluster is associated with a user count and a representative value, and
wherein the first statistical measure comprises the user count and the representative value.

5. The method of claim 4, wherein presenting the first statistical measure comprises:
selecting, based on a pre-determined criterion, the cluster from a plurality of clusters extracted from the plurality of values, wherein the plurality of clusters correspond to a plurality of similar behaviors among all users in the first subset of the plurality of users configuring the configuration parameter of the software application; and
presenting, in response to selecting the cluster, the representative value of the cluster to the new user.

6. The method of claim 1, wherein matching the new user profile to a second attribute signature of a second subset of the plurality of users comprises:
determining the plurality of attribute values in the new user profile as corresponding to the particular portion of the attribute list;
identifying, in response to the determining, a plurality of attribute signatures corresponding to the particular portion of the attribute list; and
comparing, in response to the identifying, the plurality of attribute signatures and the plurality of attribute values in the new user profile to identify the second attribute signature as a match.

7. The method of claim 6,
wherein the new user opts-in to provide user information with respect to the particular portion of the attribute list, and
wherein the new user opts-out from providing additional user information with respect to a remainder of the attribute list aside from the particular portion.

8. A system for identifying a configuration setting of a software application, comprising:
a processor;
memory storing instructions executable by the processor, wherein the instructions comprise:
a user profile analyzer configured to:
obtain a plurality of profiles of a plurality of users of the software application,
wherein each of the plurality of profiles comprises a plurality of attribute values corresponding to a portion of an attribute list of the software application,
wherein the plurality of attribute values describe a first business entity associated with a user of the plurality of users, and
wherein at least two of the plurality of profiles correspond to two different portions of the attribute list;
identify a first subset of the plurality of users having the plurality of attribute values for a particular portion of the attribute list;
form, using the plurality of attribute values, a first attribute signature of the first subset of the plurality of users corresponding to different portions of the attribute list, and a second attribute signature of a second subset of the plurality of users corresponding to different portions of the attribute list; and
match a new user profile to the second attribute signature of a second subset of the plurality of users, wherein the new user profile describes a second business entity associated with the new user;
a configuration analyzer configured to:
analyze the software application configuration setting used by each user in the first subset of the plurality of users to generate a first statistical measure representing the first subset of the plurality of users configuring the software application, and the first attribute signature of the first subset of the plurality of users;

analyze the software application configuration setting used by each user in the second subset of the plurality of users to generate a second statistical measure representing the second subset of the plurality of users configuring the software application, and the second attribute signature of the second subset of the plurality of users;

present, to the new user and in response to matching the new user profile to the second attribute signature, the second statistical measure representing the second subset of the plurality of users configuring the software application; and receive, in response to presenting the second statistical measure, an approval from the new user to customize the software application, wherein the software application is automatically customized based on the second statistical measure representing the second subset of the plurality of users configuring the software application; and a repository configured to store at least the plurality of profiles, the first attribute signature, the first statistical measure, the second attribute signature, the second statistical measure, and the configuration setting.

9. The system of claim 8,
wherein the first attribute signature comprises at least one selected from a group consisting of a geographic region of the first business entity, a business category of the first business entity, a language used by the first business entity, a currency used by the first business entity, and a tax code of the first business entity, and
wherein the configuration setting comprises at least one selected from a group consisting of an invoice setting and a sales receipt setting.

10. The system of claim 8, wherein analyzing the configuration setting comprises:
retrieving, for each user in the first subset of the plurality of users, a value of the configuration setting, wherein the value is used by a corresponding user for configuring a configuration parameter of the software application; and
aggregating the value for all users in the first subset of the plurality of users to generate a plurality of values corresponding to the first subset of the plurality of users,
wherein the first statistical measure is based on the plurality of values.

11. The system of claim 10, wherein analyzing the configuration setting further comprises:
extracting, using a pre-determined clustering algorithm and based on a pre-determined similarity measure, a cluster of similar values from the plurality of values, wherein the cluster is associated with a user count and a representative value, and
wherein the first statistical measure comprises the user count and the representative value.

12. The system of claim 11, wherein presenting the first statistical measure comprises:
selecting, based on a pre-determined criterion, the cluster from a plurality of clusters extracted from the plurality of values, wherein the plurality of clusters correspond to a plurality of similar behaviors among all users in the first subset of the plurality of users configuring the configuration parameter of the software application; and
presenting, in response to selecting the cluster, the representative value of the cluster to the new user.

13. The system of claim 8, wherein matching the new user profile to a second attribute signature of a second subset of the plurality of users comprises:
determining the plurality of attribute values in the new user profile as corresponding to the particular portion of the attribute list;
identifying, in response to the determining, a plurality of attribute signatures corresponding to the particular portion of the attribute list; and
comparing, in response to the identifying, the plurality of attribute signatures and the plurality of attribute values in the new user profile to identify the second attribute signature as a match.

14. The system of claim 13,
wherein the new user opts-in to provide user information with respect to the particular portion of the attribute list, and
wherein the new user opts-out from providing additional user information with respect to a remainder of the attribute list aside from the particular portion.

15. A non-transitory computer readable medium storing instructions for identifying a configuration setting of a software application, the instructions, when executed by a computer processor, comprising functionality for:
obtaining a plurality of profiles of a plurality of users of the software application,
wherein each of the plurality of profiles comprises a plurality of attribute values corresponding to a portion of an attribute list of the software application,
wherein the plurality of attribute values describe a first business entity associated with a user of the plurality of users, and
wherein at least two of the plurality of profiles correspond to two different portions of the attribute list;
identifying a first subset of the plurality of users having the plurality of attribute values for a particular portion of the attribute list;
forming, using the plurality of attribute values, a first attribute signature of the first subset of the plurality of users corresponding to different portions of the attribute list, and a second attribute signature of a second subset of the plurality of users corresponding to different portions of the attribute list;
analyzing the software application configuration setting used by each user in the first subset of the plurality of users to generate a first statistical measure representing the first subset of the plurality of users configuring the software application, and the first attribute signature of the first subset of the plurality of users;
analyzing the software application configuration setting used by each user in the second subset of the plurality of users to generate a second statistical measure representing the second subset of the plurality of users configuring the software application, and the second attribute signature of the second subset of the plurality of users;
obtaining a new user profile of a new user;
matching the new user profile to the second attribute signature of a second subset of the plurality of users, wherein the new user profile describes a second business entity associated with the new user;

presenting, to the new user and in response to matching the new user profile to the second attribute signature, the second statistical measure representing the second subset of the plurality of users configuring the software application; and receiving, in response to presenting the second statistical measure, an approval from the new user to customize the software application, wherein the software application is automatically customized based on the second statistical measure representing the second subset of the plurality of users configuring the software application.

16. The non-transitory computer readable medium of claim 15, wherein the first attribute signature comprises at least one selected from a group consisting of a geographic region of the first business entity, a business category of the first business entity, a language used by the first business entity, a currency used by the first business entity, and a tax code of the first business entity, and wherein the configuration setting comprises at least one selected from a group consisting of an invoice setting and a sales receipt setting.

17. The non-transitory computer readable medium of claim 15, wherein analyzing the configuration setting comprises:

retrieving, for each user in the first subset of the plurality of users, a value of the configuration setting, wherein the value is used by a corresponding user for configuring a configuration parameter of the software application; and aggregating the value for all users in the first subset of the plurality of users to generate a plurality of values corresponding to the first subset of the plurality of users, wherein the first statistical measure is based on the plurality of values.

18. The non-transitory computer readable medium of claim 17, wherein analyzing the configuration setting further comprises:

extracting, using a pre-determined clustering algorithm based on a pre-determined similarity measure, a cluster of similar values from the plurality of values, wherein the cluster is associated with a user count and a representative value, and wherein the first statistical measure comprises the user count and the representative value.

19. The non-transitory computer readable medium of claim 18, wherein presenting the first statistical measure comprises:

selecting, based on a pre-determined criterion, the cluster from a plurality of clusters extracted from the plurality of values, wherein the plurality of clusters correspond to a plurality of similar behaviors among all users in the first subset of the plurality of users configuring the configuration parameter of the software application; and presenting, in response to selecting the cluster, the representative value of the cluster to the new user.

20. The non-transitory computer readable medium of claim 15, wherein matching the new user profile to a second attribute signature of a second subset of the plurality of users comprises:

determining the plurality of attribute values in the new user profile as corresponding to the particular portion of the attribute list;

identifying, in response to the determining, a plurality of attribute signatures corresponding to the particular portion of the attribute list; and comparing, in response to the identifying, the plurality of attribute signatures and the plurality of attribute values in the new user profile to identify the second attribute signature as a match, wherein the new user opts-in to provide user information with respect to the particular portion of the attribute list, and wherein the new user opts-out from providing additional user information with respect to a remainder of the attribute list aside from the particular portion.

* * * * *